UNITED STATES PATENT OFFICE.

FREDRICK W. MUELLER, OF SEATTLE, WASHINGTON, ASSIGNOR OF ONE-FOURTH TO JOHN B. SUESS, OF SEATTLE, WASHINGTON.

COMPOSITION OF PAINT.

1,260,012.      Specification of Letters Patent.      Patented Mar. 19, 1918.

No Drawing. Application filed April 16, 1917, Serial No. 162,556. Renewed January 11, 1918. Serial No, 211,459.

*To all whom it may concern:*

Be it known that I, FREDRICK W. MUELLER, citizen of the United States, residing at Seattle, in the county of King and State of Washington, have invented a certain new and useful Improvement in Composition of Paint, of which the following is a specification.

The object of my invention is the production of a paint which shall possess qualities which specially adapt it for use in painting bridges, hulls of marine vessels, either of iron or wood, piles, railroad ties and other wooden objects, that are subjected to contact with fresh or salt water, which qualities serve to make the surfaces of the iron objects painted rust proof and the surfaces of the wooden objects water proof, moss proof and proof against attack by insects as, for instance, teredos.

My composition consists in a mixture of coal tar, benzin, salt peter, water, Japan varnish, asphaltum varnish, slaked lime and Paris green (cupric aceto-arsenite) or other suitable toxic matter.

In preparing my composition I prefer to use the ingredients in about the following proportions—viz., One barrel of coal tar.
Ten gallons of benzin.
Five pounds of salt peter.
Twenty gallons of water.
Two gallons of Japan varnish.
Two gallons of asphaltum varnish.
One gallon of shellac varnish.
Two pounds of air-slaked lime.
Five pounds of Paris green.

These ingredients are mixed by first dissolving the salt peter in the water, then adding the benzin and slaked lime, then adding the coal tar, then adding the Japan varnish, the asphaltum varnish and the shellac varnish, and finally is added the Paris green, whereupon all of the ingredients are thoroughly intermixed by stirring to form a homogeneous mass in the form of a liquid paint.

In cases where the paint is to be used upon surfaces that are not subject to attack by insects or living organisms, as teredos or barnacles, then the Paris green may be omitted without impairing the rust proof and water proof qualities of the paint.

If desired any suitable toxic matter may be substituted for the Paris green.

My composition thus made, when applied as a paint to surfaces of wood or iron which are subjected to contact with fresh or salt water and to changing weather conditions, will not blister, crack or scale off and will adequately protect such surfaces for a longer time than paints heretofore employed.

What I claim is:

1. A paint composition comprising a mixture of coal tar, benzin, salt peter, Japan varnish, water, asphaltum varnish, shellac varnish, air-slaked lime and Paris green.

2. A paint composition consisting of a homogeneous mixture containing ingredients named in proportions substantially as follows: one barrel of coal tar, ten gallons of benzin, five pounds of salt peter, twenty gallons of water, two gallons of Japan varnish, two gallons of asphaltum varnish, one gallon of shellac varnish, two pounds of air-slaked lime and five pounds of Paris green.

In witness whereof I hereunto subscribe my name this 5th day of April A. D., 1917.

FREDRICK W. MUELLER.

Copies of this patent may be obtained for five cents each, by addressing the "Commissioner of Patents, Washington, D. C."